July 26, 1938. W. L. THOMAS Re. 20,811

BOXCAR

Original Filed May 23, 1934 7 Sheets-Sheet 1

INVENTOR
William L. Thomas
BY
Lewis S. Clarkson
ATTORNEY

July 26, 1938. W. L. THOMAS Re. 20,811
BOXCAR
Original Filed May 23, 1934 7 Sheets-Sheet 2
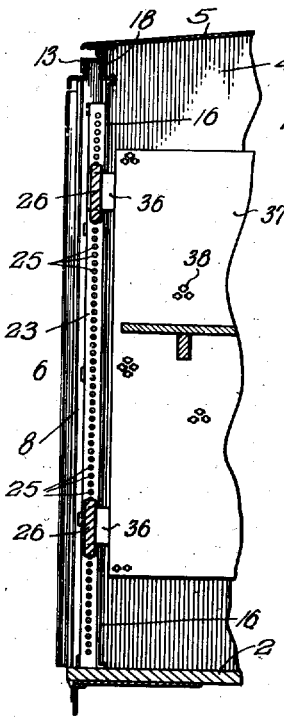
Fig. 3.
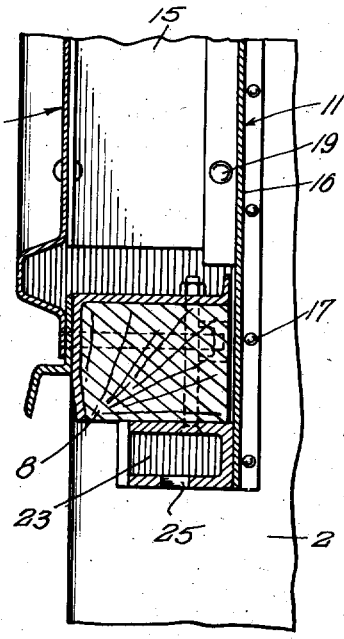
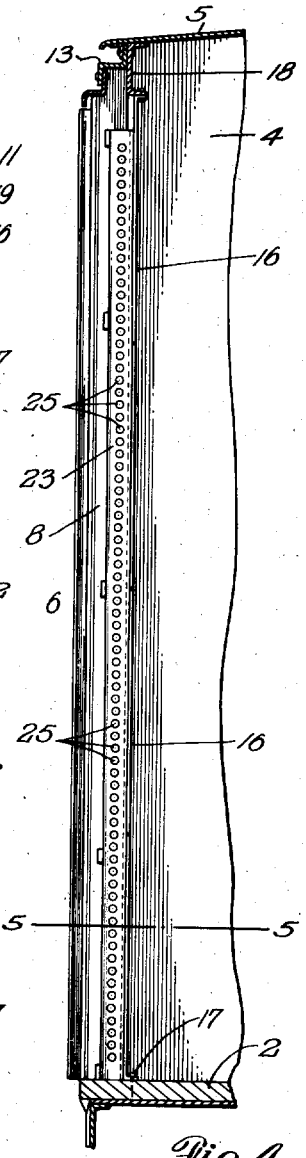
Fig. 4.
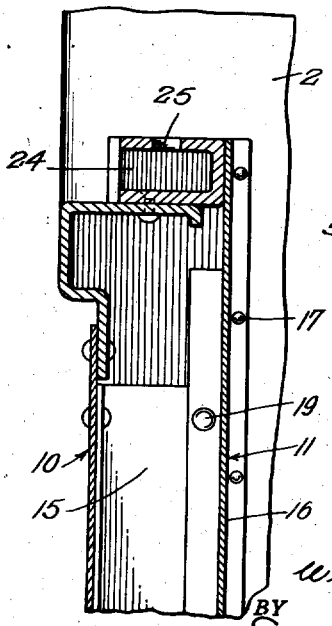
Fig. 5.
INVENTOR
William L. Thomas
BY
Lucius S. Clarkson
ATTORNEY July 26, 1938. W. L. THOMAS Re. 20,811
BOXCAR
Original Filed May 23, 1934 7 Sheets-Sheet 3
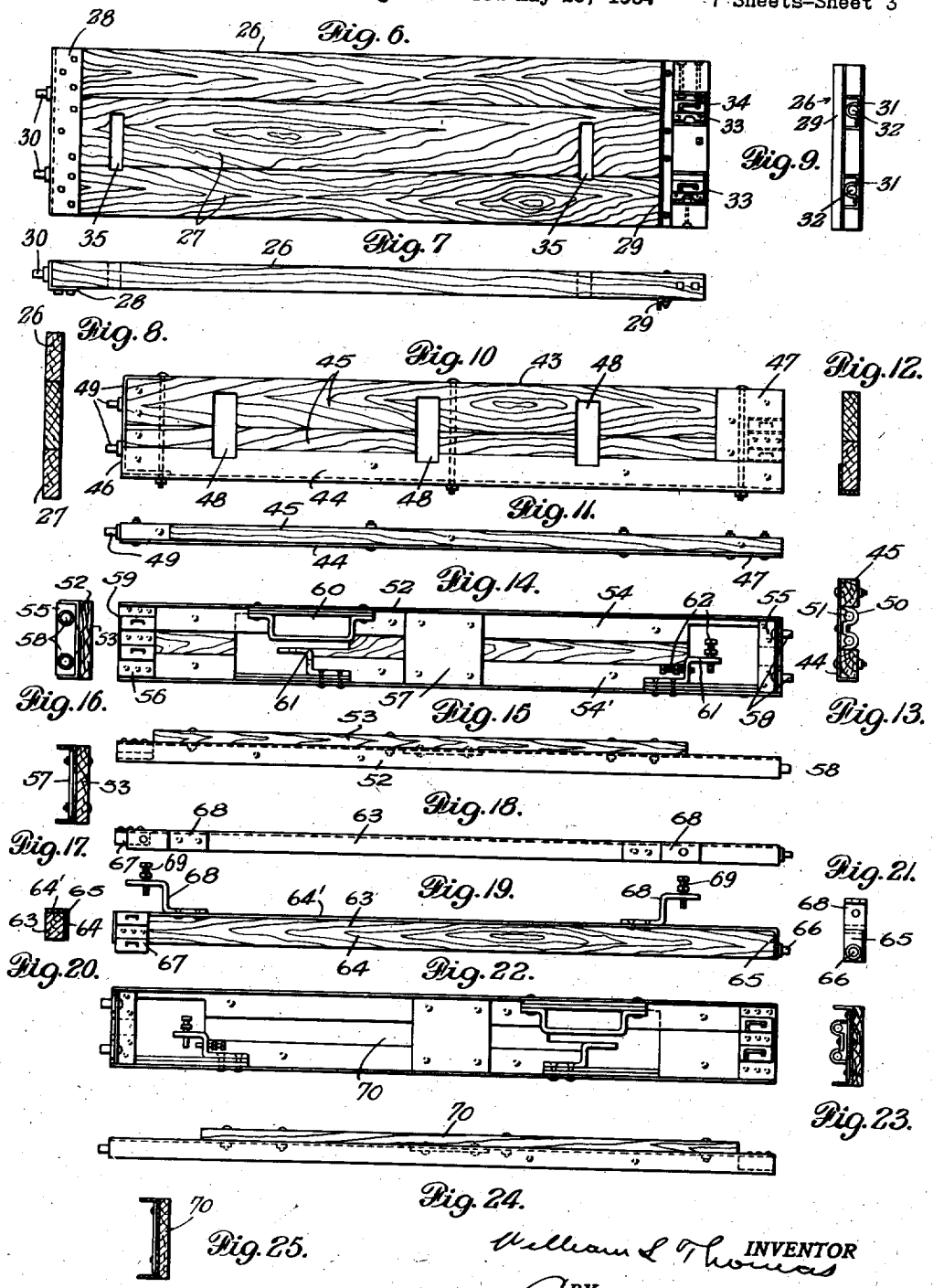
William L. Thomas INVENTOR
BY
James A. Clarkson
ATTORNEY July 26, 1938. W. L. THOMAS Re. 20,811

BOXCAR

Original Filed May 23, 1934 7 Sheets-Sheet 4

William S. Thomas INVENTOR

BY

James S. Clarkson

ATTORNEY

July 26, 1938. W. L. THOMAS Re. 20,811

BOXCAR

Original Filed May 23, 1934 7 Sheets-Sheet 5

William L. Thomas INVENTOR

BY

Quinn A. Clarkson

ATTORNEY

William L. Thomas INVENTOR

BY

James S. Clarkson

ATTORNEY

July 26, 1938. W. L. THOMAS Re. 20,811

BOXCAR

Original Filed May 23, 1934 7 Sheets-Sheet 7

William L. Thomas INVENTOR

BY

Lewis S. Clarkson

ATTORNEY

Reissued July 26, 1938

Re. 20,811

UNITED STATES PATENT OFFICE 20,811

BOXCAR

William L. Thomas, Haverstraw, N. Y., assignor to The New York Central Railroad Company, a corporation of New York Original No. 2,038,692, dated April 28, 1936, Serial No. 727,172, May 23, 1934. Application for reissue December 29, 1937, Serial No. 182,369

33 Claims. (Cl. 105—376)

This invention relates to improvements in box cars, and particularly to means for holding partitioning or supporting elements for partitioning the car into holding compartments and/or providing therein supporting floors or platforms of suitable size or sizes for holding or supporting different kinds or sizes of goods to be shipped. More particularly the invention relates to means whereby a portion or all of the space between doorways transversely of the car may be so partitioned and utilized for the reception and transportation of freight.

The general object of the invention is to provide improvements in means of the type shown in my prior application Serial No. 688,397, filed September 6, 1933, for variably partitioning the interior of a box car to divide the same into holding compartments and/or to support therein floors or platforms whereby one and the same car may be used to hold mixed kinds and/or sizes of goods in separate lots and in such manner as to keep the lots separated from each other and to enable the full capacity of the car to be used for shipment of such goods to the same destination or to different destinations.

The particular object of the invention is to provide partitioning and supporting means across the doorways and across the interior of the car between the doorways for the purposes above described and which are of such construction as to furnish a more convenient and flexible arrangement for changing the supporting and partitioning elements as occasion may require under different conditions of service.

The invention consists of the features of construction, combination and arrangement of parts, hereinafter fully described and claimed, reference being had to the accompanying drawings, in which:

Fig. 3 is a vertical transverse section through the car taken on line 3—3 of Fig. 1.

Fig. 4 is a view similar to Fig. 3 with supports and partition removed and showing clearly one of the door posts.

Fig. 5 is a horizontal section on an enlarged scale through a portion of one of the side walls and one of the terminal posts and the intermediate post of a doorway.

Figs. 6, 7, 8 and 9 are, respectively, a side view, a top plan view, a cross-section and an end view of a doorway partition and supporting member.

Figs. 10 to 29, inclusive, are similar group views showing modified forms of construction of doorway or cross partitioning and supporting members.

Figure 30:
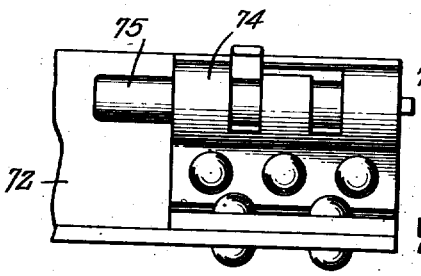
Figure 31:
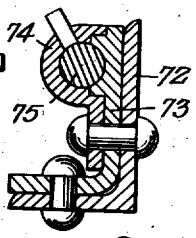

Figs. 30 and 31 are side and cross-sectional views of the latch end of a doorway or cross partition and supporting member, showing the latch bolt structure thereof.

Figure 32:
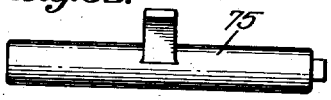
Figure 33:
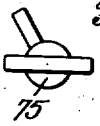

Figs. 32 and 33 are longitudinal and cross-sections thereof.

Figure 34:
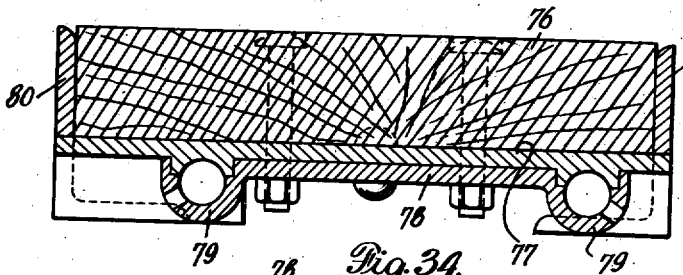
Figure 36:
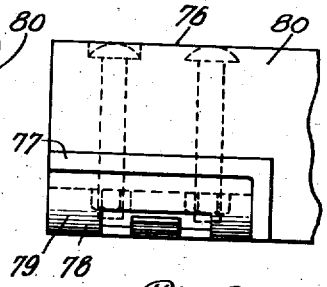
Figure 35:
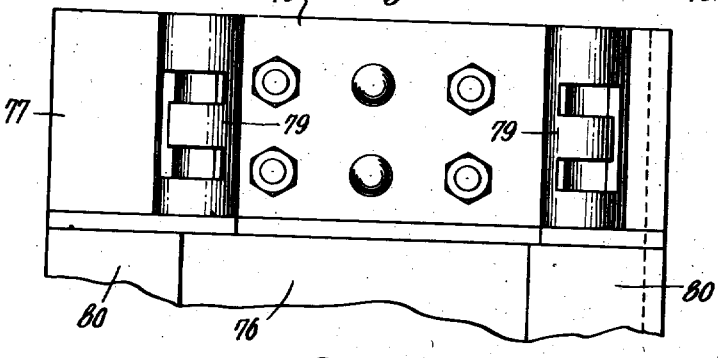

Figs. 34, 35 and 36 are a side view, a cross-section and an end view showing another modified form of construction of latch bolt structure.

Figs. 37 and 38 and Figs. 39 and 40 are side elevations and cross-sections showing still other modified forms of latch constructions.

Figs. 41 to 46, inclusive, are views showing the use of plate-type latches instead of bolt-type latches.

Figure 47:
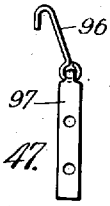
Figure 48:
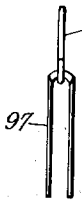

Figs. 47 and 48 are similar views showing the use of a hook latch.

Figure 1:
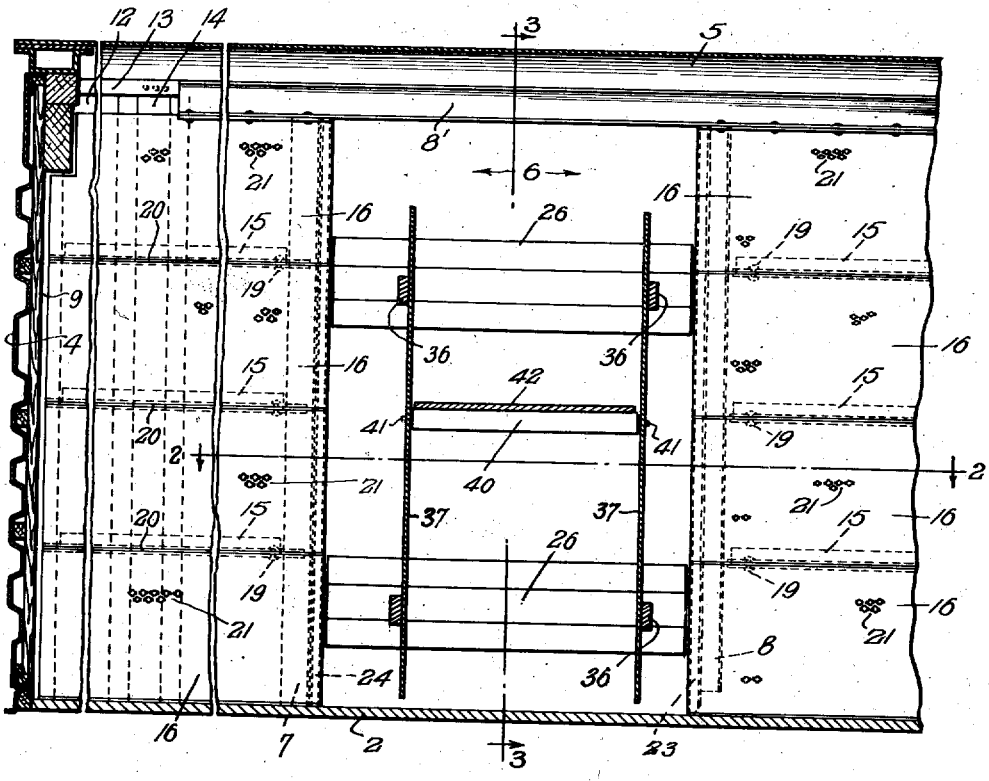
Fig. 1 is a vertical longitudinal section through a portion of a railway car embodying my invention, looking toward one of the doorways thereof.
Figure 2:
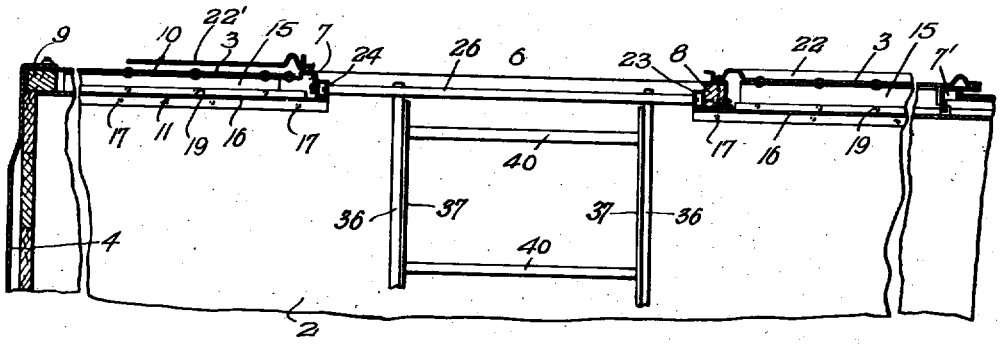
Fig. 2 is a horizontal section on line 2—2 of Fig. 1.
Figure 26:
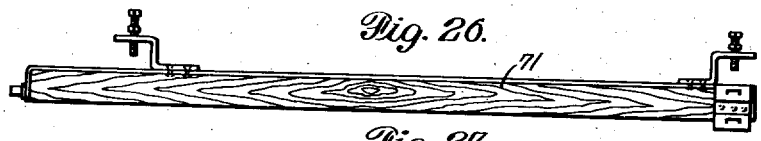
Figure 29:
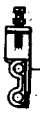
Figure 27:
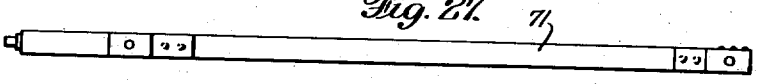
Figure 28:
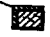
Figure 49:
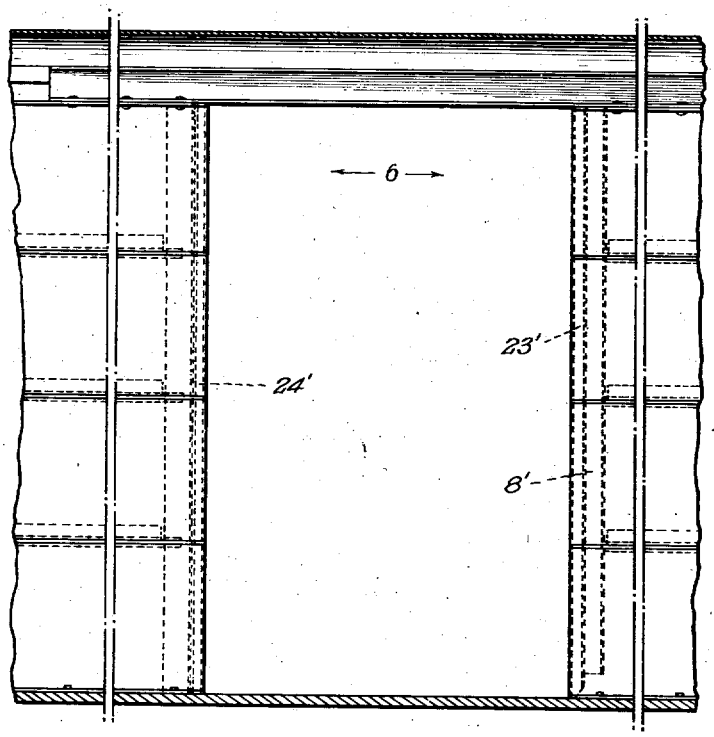

Fig. 49 is a view similar to Fig. 1 illustrating a modified construction of the doorway stiles.

Figure 50:
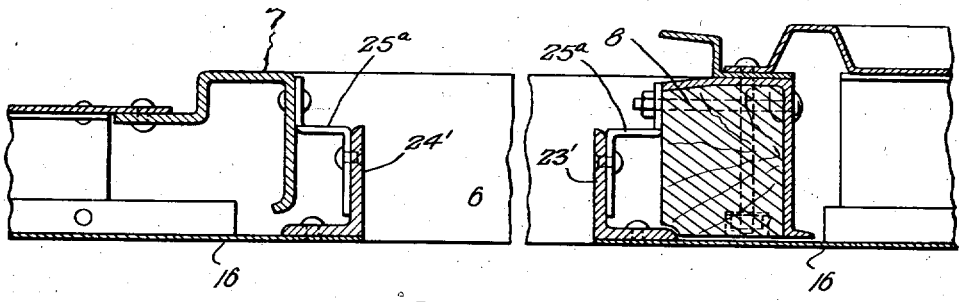

Fig. 50 is a horizontal section through the doorway structure shown in Fig. 49.

Figure 51:
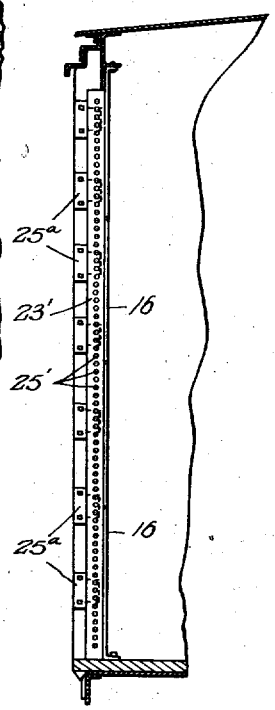

Fig. 51 is a vertical section through the doorway structure shown in Figs. 49 and 50, looking toward one of the door posts.

Figure 52:
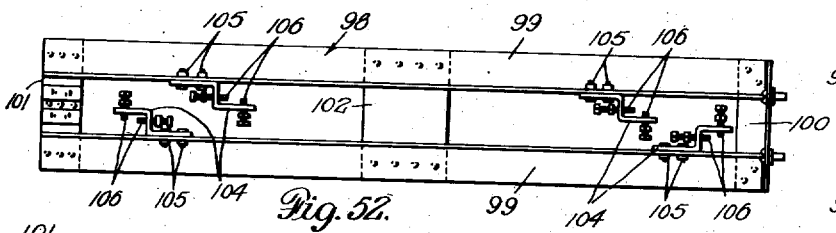
Figure 54:
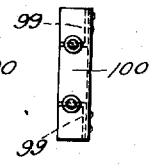
Figure 53:
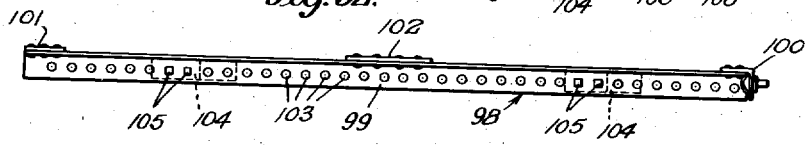

Figs. 52, 53 and 54 are, respectively, a side elevation, a top plan view and an end view of a modified form of doorway or cross partition or supporting member.

Figure 56:
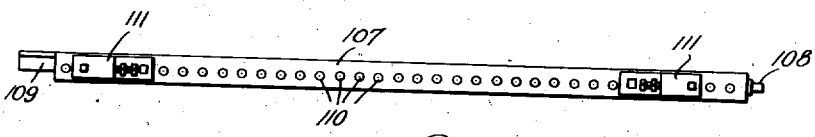
Figure 55:
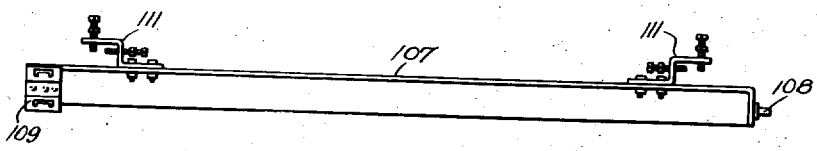
Figure 57:
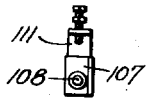

Figs. 55, 56 and 57 are similar views of a modified construction of supporting bar.

Referring now more particularly to the drawings, 1 designates the car body which is or may be of usual box body form, and comprises the bottom 2, side walls 3, end walls 4 and roof 5. The bottom 2, end walls 4 and roof 5 may be of any suitable and approved construction. The side walls 3, however, may be of special construction, as disclosed in my aforesaid prior application Serial No. 688,397, to adapt the same for use in conjunction with supporting and/or partitioning members, whereby the interior of the car, between the end walls and the doorways, may be divided into goods holding compartments and/or provided with shelves or platforms for supporting goods of different sizes or kinds therein.

Each side wall 3 is provided with a central doorway 6 including terminal angle metal door posts 7, 7', an intermediate door post 8, and a metal lintel beam 8', and each portion of the wall 3 between each door post 7, 7' and the corner portion 9 at its intersection with the end wall 4 on the same side of the transverse center of the body comprises outer and inner wall sections 10 and 11. The outer wall section 10 is formed of vertically extending metal sheets 12 riveted or otherwise secured to each other at their lapping edges and also secured to the side sill channel and Z-bar eaves beams 13, to channeled intermediate posts 14, and to longitudinal (horizontal) angle beams 15 forming with the respective posts a rigid wall framing. The inner wall section 11 consists of longitudinally (horizontally) extending sheets 16, the lowermost sheet having its lower longitudinal edge flanged inwardly and secured to the floor by lag screws or bolts 17, the uppermost sheet having its upper longitudinal edge turned outwardly or toward the wall section 10 and secured at intervals along the major length of the car by brackets 18 to the eaves beam 13 and in the region of the doorway 6 to the lintel beam 8'. At their adjacent edges the sheets 16 are flanged toward the wall section 10 and bolted or riveted, as at 19, to the angles 15 and welded, as at 20, to the post 14, the sheets of both wall sections 10 and 11 being thus firmly united to each other and to a rigid framing and providing a double wall of great strength to serve as a support for the partitioning and supporting members. This double wall structure is hollow, the wall sections 10 and 11 being held spaced by the framing, so that an air space is provided therebetween to insulate the interior of the car against rapid heat exchange action between the same and the outer atmosphere. This hollow space may, if desired, be filled with insulating material of any suitable and approved sort. As shown, the sheets 16 are perforated, being formed throughout with longitudinal (horizontal) and transverse (vertical) rows of slots or openings 24. Each opening is of double key-hole-shaped type, having alined straight end portions intersecting a central circular enlargement. These openings form keepers for interchangeable locking engagement with headed engaging and locking elements on partitioning and supporting members, as hereinafter described.

The doorway 6 in each wall is specially formed or modified as compared with a conventional construction of doorway in order that the width of a normal doorway may be reduced when employing the car as a partitioned car for the purpose set forth. To this end an extra or intermediate door post 8 in each wall 3 is provided, and a door 22 is mounted so that it may be used to permanently close the space or half of the doorway between this extra post 8 and one of the conventional or fixed posts, as the post 7', as long as the car is used as a partitioned car, leaving the remaining half of the doorway between the posts 7 and 8 normally open for service use, but adapted to be closed whenever desired by a door 22'. The inner wall structure at the closed side or half of the doorway is also modified by extending the sheets 16 between the other conventional or fixed door post 7' and the post 8, thereby increasing the available storage space between the transverse line of the post 8 and the end of the car including the closed half of the doorway. By this means a narrow service doorway of sufficient width is left for access to the car and loading purposes as well as unloading purposes, if desired, which narrow doorway may be conveniently closed, and this arrangement allows the closed half of the doorway to be packed solidly from side to side of the car to increase its storage capacity. Secured to the posts 7 and 8 at the sides of the open portion of the doorway are channeled stiles or holders 23 and 24, each consisting of a U-shaped channel member having its closed base facing outwardly and its open portion facing inwardly. One of the side walls of each channel member 23 and 24 is bolted, riveted or otherwise suitably fastened to the post 7 or 8, as the case may be, and the other side wall of each channel member is provided from top to bottom with circular, double key-hole shaped or other suitably formed keeper slots or openings 25 arranged at equal distances apart and in comparatively close relation to each other. The perforated stiles so constructed have their similar perforations or keeper openings arranged in horizontal alinement with each other to receive engaging elements on doorway partitions or supporting members whereby the portion of the car body between the doorways may be subdivided into goods holding compartments at desired points and elevations and/or provided with goods supporting platforms at desired points and levels by means of doorway closing and partitioning and supporting members mounted on the side walls and attached to the perforated stiles of the doorway, some of which partitioning and supporting members and doorway closing members are herein shown, the construction and use of which I will now proceed to describe.

In Figs. 6 to 9, inclusive, I have shown a form of doorway closure and support 26 comprising a plurality of superimposed wooden beams or boards 21 bolted at their ends to angle metal tie members 28 and 29. At one end the closure and supporting member 26 is provided with a pair of superposed supporting and locking studs 30 carried by the plate 28 and which are spaced a suitable distance apart for engagement with similarly spaced openings 25 in the stile at one side of the doorway. At its other end the closure and supporting member 26 carries guideway housings 31 in which are mounted sliding supporting and locking bolts 32, the stem of each bolt being provided with a manipulating handle 33 having engagement with a guide slot 34 in the housing, which slot is provided with angularly disposed ends in which the stem is adapted to be received to lock the bolt in projected or retracted position. The bolts are spaced a distance apart corresponding to perforations or openings 25 in the other stile of the gate, with which openings 25 the bolts are slidably engageable, whereby the closure and partition member may be secured in the opening in the doorway at any desired elevation therein. The member 26 is provided with one or more sockets or keeper openings 35 to receive the ends of transverse supporting bars 36 adapted to be extended transversely of the car between the doorway spaces and engaged with opposite doorway closure members 26 to support a vertical partition 37 in position across the car between the doorways. This partition 37 may be provided, like the inner sheets 16 of the body side wall, with double key-hole-shaped or other suitably formed slots or openings 38 similar to slots or openings 21, engageable by suitable locking studs 39 on the member 40 whereby said member 40 may be supported in position thereon. Transverse partition sheets may be arranged in this way to form a compartment or compartments in the center of the car between the doorway spaces, or to separate such portions of the car between the center and ends, whereby a desired number and arrangement of compartments to receive goods of different kinds and/or sizes may be provided on the interior of the car. The perforated vertical partitions 31 may also serve as supports for supporting bars 40 having headed studs or fastening members 41 to engage the slots therein, on which bars boards 42 may be laid to provide shelves or platforms at different elevations in the car to support different kinds and/or sizes of goods in vertically spaced relation to each other. By the use of such closure members, partitions and supports, the doorways at the sides of the car may be either completely or partially closed and the space across the car between the doorways may be compartmented and shelved or platformed in the manner described so as to enable any kind and/or size of freighting to be conveniently stored, so that the freight containing capacity of the car may be increased and varied kinds of freight carried and kept separate from each other. The construction of each support 26 with fixed lapping studs at one end and sliding bolts or fastening members at its opposite end adapts the stud end of the closure member to be engaged with and disengaged from a perforate doorway stile by longitudinal movement of said member and permits the other end of the member to be engaged with and disengaged from the other perforate locking stile by a lateral movement into or out of position and a longitudinal shifting movement of the locking bolts in one direction or the other. This not only adapts the closure members to be readily and conveniently applied and removed but also allows of the use of locking bolts of any desired length so that variations in the distance between the posts 7 and 8, in different cars, may be compensated for by adjustment of the locking bolts.

In Figs. 10 to 13, inclusive, a combined doorway closure and supporting member 43 is shown comprising a bottom angle beam 44, a pair of superposed wooden beams or bars 45, a tie bracket 46 at one end of the member and a tie plate 47 at the opposite end thereof, said beams or bars 45 having keeper openings 48 similar for the same purpose as the openings 45 formed in the beams 27. Carried by the bracket 46 at one end of the member 43 are locking studs 49 and carried by the plate 47 at the opposite end of the member is a latch bolt housing 50 of the structure previously described carrying sliding latch bolts 51, which studs at one end of the member and bolts at the opposite end of the member may be arranged any desired distance apart for cooperation with particular openings in the perforate stiles. This form of member 43 may be of the same depth as the member 26 or of greater depth or of less depth and is applied to and removed from the stiles in the same manner as the member 26.

In Figs. 14 to 17, inclusive, I have shown another form of doorway closure member and support 52 comprising a board or plank 53 of the full depth of the member, to one side of which are attached top and bottom angle beams 54 and 54' extending at their ends beyond the ends of the plank 53 and united by end tie plates 55 and 56 and a central tie plate 57, the tie plate 55 carrying locking studs 58 and the tie plate 56 carrying latch housings and bolts 59 of the structure previously described or any approved and equivalent structure. Carried by the beam 54 is a looped bracket or stirrup 60 adapted to receive the ends of supporting bars or members, and carried by the beam 54' are Z-shaped brackets 61 forming with the bars keepers to receive the ends of supporting members, said brackets 61 being provided with clamping screws 62 or the like for securing the supporting bars in fixed relation thereto.

In Figs. 18 to 21, inclusive, I have shown still another form of doorway partition or support 63 comprising a single wooden bar 64 and an associated L-beam 64', said beam 64' having a bent portion forming a bracket 65 at one end carrying a locking stud 66 and said beam 64' having attached thereto at its opposite end a bracket plate, housing and latch bolt structure 67 of the type previously described. The beam 64' has attached thereto Z-shaped clamping brackets 68 provided with clamping screws or elements 69 for the attachment thereto of supporting members as previously described to which cross partitions may be attached or on which shelving boards may be laid. This form of partition and support 63 provides one of minimum depth which may be attached to the stiles by means of a single fixed locking stud at one end and a pair of bolt members at its opposite end, a pair of bolt members being employed to prevent rotation of the member 63, whereby a support holding member which occupies but little vertical space may be employed at any point in the depth of a doorway desired.

In Figs. 22 to 25, inclusive, still another closure and support 70 is shown which is generally similar in construction to that disclosed in Figs. 14 to 17, inclusive, and corresponding parts of which are designated by the same reference characters, substantially the only difference being in the arrangement of the plank and angle beams, side for side, with respect to each other, and the reversed arrangement of the locking studs and bolts, end for end, at opposite ends of the member, the arrangement being such that a member similar to the member 52 may be provided in which the holding parts are differently disposed when the member 70 is placed in the same position as member 52 in either doorway.

In Figs. 26 to 29, inclusive, I have shown still another form of closure and supporting member 71 which is generally similar in construction to the member 63 except as regards a similar reversal in arrangement of parts thereof with respect to each other as that specified with relation to members 52 and 70.

In the aforesaid cases the latch bolts and their housings may be of the same construction and operate in the same manner, and by the use of closure members and supports of different depths and differently spaced sets of studs and latch bolts it will be understood that similar or dissimilar closure and supporting members may be placed in the doorways and locked to the stiles thereof to partially or wholly close each doorway and to provide supporting means in the doorways for holding a desired number and arrangement of cross supports, partitions and shelves or platforms to divide the space transversely of the car between the doorways into compartments or to arrange therein shelves or platforms at desired elevations, so that the space may be apportioned and divided in a most effective manner for the storage of a maximum amount of freight or most convenient disposition of the same for storage in transit.

Figure 37:
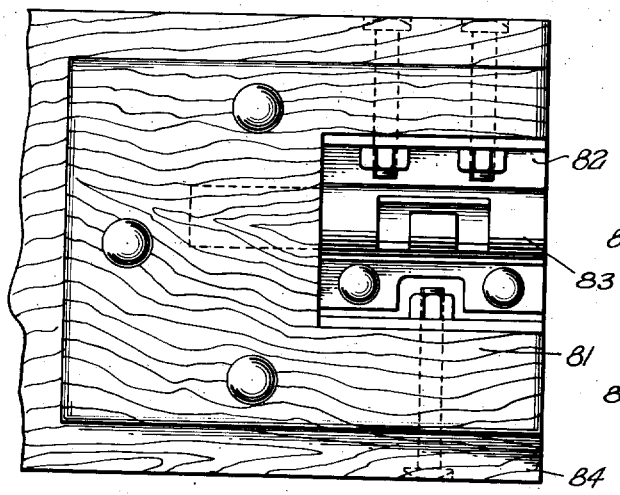
Figure 38:
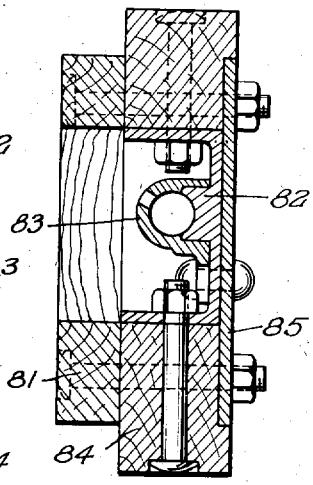
Figure 39:
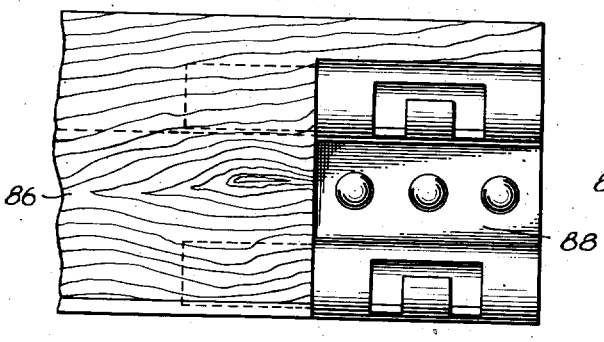
Figure 40:
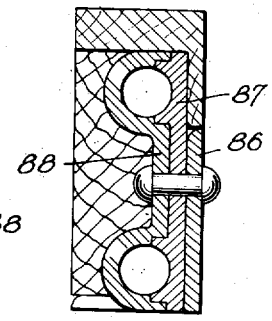

In Figs. 30 to 40, inclusive, I have shown various constructions of latch bolts which may be employed upon a partitioning or supporting member. As shown in Figs. 30 and 31 the partitioning or supporting member 72 or a bracket arranged thereon carries a bolt housing comprising an angle body member 73 and a cap member 74, which are bolted or riveted to the part 72, and which members have an interlocking connection and are formed to provide the channeled housing and locking slots for the latch bolt 75. The latch bolt 75 may be of the type illustrated in Figs. 32 and 33, mounted to slide longitudinally in the housing into and out of locking position and to rotate laterally so as to bring its stem or finger piece into and out of locking engagement with the locking ends of the guide slot in the housing. In Figs. 34, 35 and 36, a twin type of latch bolt construction is provided for a comparatively deep partitioning or supporting member 76 in which the bolt housing comprises a body plate 77 and a cap plate 78, bolted, riveted or otherwise suitably united, and provided with mating portions suitably shaped and interengaged to form the bolt receiving channels 79, which may be of the structures previously described. The body plate 77 in this structure may be welded to an angle beam 80 forming part of the partitioning member. The bolt housing 79 may be spaced any desired distance apart corresponding to the stile openings 25 to be engaged thereby. In Figs. 37 and 38, the partitioning or supporting member 81 is provided with a single, centrally located, inset or mortised bolt housing comprising a channeled body plate 82 in the channel of which is disposed a cap plate 83, bolted, riveted or otherwise secured thereto and cooperating therewith to form the bolt receiving channel having lateral locking slots. The member 81 herein shown comprises spaced bars or beams 84, between the ends of which the bolt housing is arranged, which bars and housing are united by a bracket plate 85. In Figs. 39 and 40, an angle metal type of partitioning or supporting member 86 is shown carrying a double or twin type of latch housing comprising connected body and cap plates 87 and 88, which are or may be similar in construction to the housing shown in Figs. 34 to 36, inclusive, except that the housing channels are spaced apart to a lesser degree to engage more closely related openings 25 in the door post stile. These and other forms of construction of bolt housings may be employed to meet various requirements of service. In the use of the invention on cars where different forms and sizes of partitioning and supporting members may be employed with advantage to meet different contingencies of service.

Figure 41:
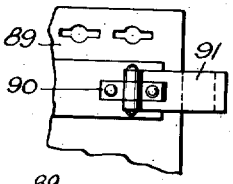
Figure 42:
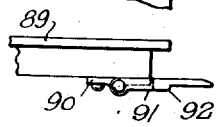
Figure 43:
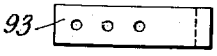
Figure 44:
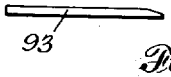
Figure 45:
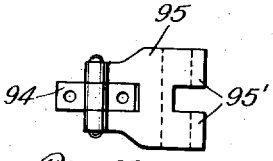
Figure 46:
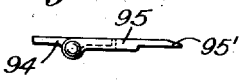

In Figs. 41 to 46, inclusive, I have shown some different forms of latch plates or members which may be used upon supporting or partitioning members adapted for engagement with the double key-hole-shaped slots in the vertically disposed partition plates or sheets used to divide the car interior into chambers or compartments. In Figs. 41 and 42 there is shown a partition plate or sheet 89 provided with a latch plate comprising a bracket member 90 carrying a hinged or pivoted latch plate 91 having a beveled outer end portion adapted for engagement with a perforation 21 in a partition sheet or plate to connect the plate or sheet 89 therewith. This latch plate has a shoulder 92 to limit its insertion movement and is adapted when engaged with a receiving perforation or opening to fold up against the partition sheet or plate or a stop carried thereby to maintain it in its proper locking position. In Figs. 43 and 44 there is shown on the partition plate or sheet a fixed or rigid latch plate 93 having a beveled end portion to engage a slot or opening 21. In Figs. 45 and 46 the partitioning plate or sheet is provided with a latch plate comprising a bracket member 94 carrying a hinged or pivoted latch plate 95 similar to the plate 92 except that the outer portion of said latch plate is bifurcated or forked to provide twin engaging members 95′ for insertion into a pair of adjacent openings 21 in a partition plate or sheet.

In Figs. 47 and 48 a different type of locking or latch element is disclosed which comprises a latch hook 96 adapted for engagement at its free end with one or more holes or perforations 21 in the partition plate or sheet and pivotally connected with a stirrup member or U-shaped bracket 97 which is suitably fastened to the partition plate or sheet.

In Figs. 49, 50 and 51 I have shown a modified construction of the doorway stiles in which the stiles 23′ and 24′ are formed of substantially L-shaped angle iron members the flange portions of which are secured to the sheets 16 and the body portions of which are disposed in parallel relation to the sides of the posts 7 and 8 facing the doorway and are secured thereto by Z-shaped brackets 25a, said body portions of the stiles being provided with the keeper openings or perforations 25′ to receive the latches and locking studs or projections upon the doorway closing and supporting members 26, etc. This provides a simplified construction and mode of attachment of the stiles to the door posts for the adjustable attachment thereto of the doorway closure and supporting members.

In Figs. 52, 53 and 54 I have shown a modified construction of combined doorway closure and supporting members 98, similar to the member 43 shown in Figs. 14 to 17, inclusive, except that the closure and supporting member comprises a pair of longitudinally extending parallel angle iron bars or plates 98 connected and held in spaced relation by sheet metal end tie plates 100 and 101 and an intermediate tie plate 102, the horizontally disposed flanges or portions of which are provided with rows of longitudinally extending perforations 103 for the adjustable connection therewith of angle metal supporting brackets 104 which are attached thereto by bolts 105 and which carry the clamping screws 106 for engaging and holding supporting bars in position thereon. This construction provides a strong and durable type of closure and supporting member to which brackets of the indicated character may be adjustably attached for the support therefrom of supporting bars in practically any arrangement desired.

In Figs. 55, 56 and 57 I have shown a modified construction of supporting bar 107 similar in type to the supporting bar shown in Figs. 19, 20 and 21, except that the bar 107 is of angle metal having at its opposite ends the engaging stud 108 and latch plate 109 riveted or otherwise suitably attached thereto. The horizontally extending flange or portion of this bar is provided with perforations 110 for attachment thereto of brackets 111 which are similar in construction to the brackets 104 and adapted to be adjustably applied in like manner. This construction provides a simple form of supporting bar on which the clamping brackets may be mounted for attaching thereto other supporting bars or elements at different points in the length thereof.

The uses of these different forms of latch elements or connectors will be readily understood from the drawings and the foregoing description, as well as the mode of application and use of the different forms of latch bolt connectors previously described. Also the manner in which the door partitioning or supporting elements and the cross supports and longitudinal and cross partition plates or sheets are secured in position for use will be readily apparent without a further or extended description. By the use of these various devices in proper combination and arrangement the interior of the car across the space between the doorways may be readily and conveniently divided or partitioned and shelved to carry different sizes and/or kinds of freight or lading so that the same may be stored and transported with the greatest ease and convenience for economy in transportation and facility in segregating and shipping, as well as handling, different kinds of goods or commodities in separate units or in lots or other arrangements to the best advantage.

While the structures shown in the drawings are preferred, it will, of course, be understood that changes in the form, construction and arrangement of parts may be made within the scope of the appended claims without departing from the spirit or sacrificing any of the advantages of the invention.

What I claim is:

1. In supporting and partitioning means for use in box cars, a car having a doorway, posts at opposite sides of the doorway, angle metal stiles secured to the opposed faces of the posts and having rows of perforations therein, and a supporting or partitioning member having a fixed locking projection at one end for engagement with the perforations in one of the perforated stiles and having a slidable locking projection at its opposite end for engagement with the perforations in the other perforated stile.

2. In supporting and partitioning means for use in box cars, a car having a doorway, posts at opposite sides of the doorway, angle metal stiles secured to the opposed faces of the posts and having rows of perforations therein, and a supporting or partitioning member having a fixed locking projection at one end for engagement with the perforations in one of the perforated stiles and having a slidable locking bolt at its opposite end for engagement with the perforations in the other perforated stile, with means for locking said bolt in projected or retracted position.

3. In supporting and partitioning means for use in box cars, a car having a doorway, posts at opposite sides of the doorway, angle metal stiles secured to the opposed faces of the posts and each provided with a row of equally disposed perforations extending from top to bottom thereof, and a partitioning or supporting member adapted to be disposed across the doorway between said stiles and arranged at desired elevations in the doorway, said partitioning or supporting member being provided at one end with a plurality of vertically spaced fixed engaging elements and at its opposite end with a plurality of vertically spaced sliding locking members for engagement with the perforations in the respective stiles.

4. In supporting and partitioning means for use in box cars, a car having doorways in its sides each provided with posts at opposite sides thereof, angle metal stiles secured to the opposed faces of the posts and each having a vertical row of spaced perforations therein, a supporting or partitioning member adapted to be extended between said stiles and having engaging members at its opposite ends to engage the perforations therein, said member also having keeper elements, and cross supporting or partitioning members adapted to be engaged with said keeper elements of supporting or partitioning members engaged with the stiles of the doorways and extended across the car between the doorways.

5. In supporting and partitioning means for use in box cars, a car having doorways each provided with posts, angle metal stiles secured to the opposed faces of the posts and each having a vertical row of perforations therein, horizontal supporting or partitioning members adapted to be disposed across the doorways and having projections adapted for engagement with the perforations in the stiles and also having keepers therein, transverse supporting or partitioning members adapted to be extended across the interior of the car between the doorways and engaged with the keepers of the first-namd supporting or partitioning members, said transverse supporting or partitioning members having engaging elements, and vertically disposed supporting sheets having openings therein for the reception of the engaging elements on said transverse supporting members and for the attachment of other supporting elements at different points thereon.

6. In supporting and partitioning means for use in box cars, a car having doorways in its opposite sides each provided with posts, angle metal stiles secured to the opposed faces of the posts and each having a vertical row of perforations therein, supporting or partitioning members adapted to be extended across the doorways and having projections adapted for engagement with the perforations in the posts, a plurality of longitudinally spaced vertical transverse supporting or partitioning members adapted to be extended across the interior of the car between the doorways and provided with fastening means for engagement with the first-named supporting or partitioning members, said transverse supporting members having keepers, and horizontal members adapted to be extended between and engaged with the keepers of the transverse supporting members to form or support shelves or platforms at different elevations of the car.

7. In supporting and partitioning means for use in box cars, a car having doorways in its opposite sides each provided with posts, angle metal stiles secured to the opposed faces of the posts and each having a vertical row of perforations therein, supporting or partitioning members adapted to be extended across the doorways and having projections adapted for engagement with the perforations in the posts, transverse supporting or partitioning members adapted to be extended across the interior of the car between the doorways and provided with means for engagement with the first-named supporting or partitioning members, said transverse supporting elements having engaging elements thereon, vertically disposed partitioning sheets or plates adapted to be disposed transversely of the car and having rows of openings therein to receive the engaging elements on the transverse supporting members to partition the car into chambers or compartments, and horizontal supporting members having engaging elements adapted to be engaged with the openings in the sheets to form or support shelves or platforms at different elevations in the car.

8. In supporting and partitioning means for use in box cars, a car having a doorway, supporting posts at opposite sides of the doorway, angle metal stiles secured to the opposed faces of the posts and each having a vertical row of perforations, and a supporting or partitioning member adapted to be extended between said posts, said member being provided at one end with studs to engage openings in one of the posts and provided at its opposite end with sliding latch bolts to engage perforations in the other post.

9. In supporting and partitioning means for use in box cars, a car having doorways in its sides each provided with posts, each having a vertical row of perforations, a supporting member extended between the posts of each doorway and having projections adapted for engagement with the perforations therein, and a partition sheet or plate adapted to be disposed transversely of the car and provided with means for engagement with said supporting members to divide off portions of the car, said sheet or plate having keyhole-shaped openings therein for supporting other supporting or partitioning members thereon.

10. In supporting and partitioning means for use on box cars, a car having a doorway provided with posts, wall sheets on the outer and inner sides of the posts, angle metal stiles, brackets securing said stiles to the posts and inner wall sheets, each stile having a vertical row of perforations therein for the adjustable engagement therewith of closure or supporting members.

11. In means for altering the structure of the side wall of a box car body of conventional type having a doorway embodying a pair of door posts spaced a predetermined distance apart, outer walls extending between the opposite end walls of the body and said posts, and an inner sheathing extending between the opposite end walls of the body and said posts, the combination of a third post positioned between the aforesaid posts, channeled stiles disposed upon the opposed faces of one of the door posts and said third post, a supporting member extending between said stiles and having fastening elements adapted for detachable and adjustable engagement therewith for supporting said member at different elevations, the said sheathing having an extension between the other door post and the said third post to close the inner side of the intervening space, a door mounted on the wall opposite said sheathing extension to close the outer side of said space, and a door slidably mounted on the outer wall to close the outer side of the space between the stile carrying posts.

12. In supporting and partitioning means for use in box cars, a car having side walls provided with transversely alined doorways, channeled metal stiles on the opposed faces of the jambs at the opposite sides of each doorway, each having one of its side walls facing the jamb and secured thereto and its other side wall facing the other stile and provided with a vertical row of openings extending substantially throughout its length, supporting bars adapted to be extended across each doorway and provided with engaging elements adapted for detachable and adjustable engagement with the perforations in the said stiles, partition sheets carried by said bars and extending transversely of the car between the doorways, said partition sheets having openings therein, and article supporting members provided with fastening projections adapted to engage the openings in the sheets.

13. In supporting and partitioning means for use in box cars, a car having a side wall provided with a doorway, channeled metal stiles on the opposed faces of the jambs at the sides of the doorway, each having one of its side walls facing the jamb and secured thereto and its other side wall facing the other stile and provided with a vertical row of openings extending substantially throughout its length, and a supporting element adapted to be extended across the doorway between the stiles and provided with engaging elements adapted for detachable and adjustable engagement with the perforations in said stiles.

14. In a box car, a car having a doorway including side posts having channeled portions, each including a wall facing the doorway and provided with a vertical row of perforations extending substantially the height of the doorway, each perforation opening into the channel and doorway space, and a vertically adjustable supporting member adapted to be inserted into and withdrawn from the space between said posts by movements in a direction transversely and longitudinally of the car and having projections at its ends adapted for interchangeable selective engagement with perforations at any level in the height of the perforated walls of the channeled portions.

15. In a box car, a car having a doorway including side posts having channeled portions, each presenting a wall facing the doorway and provided with a vertical row of perforations extending substantially the height of the doorway, each perforation opening into the channel and doorway space, and an adjustable supporting member bridging the space between said posts and having a projection at each end thereof, said projections being adapted for engagement with selected perforations in the perforated walls of the channeled portions, the projection at at least one of the ends of the supporting member comprising a bolt slidable longitudinally of said member.

16. In a box car, a car having a doorway including side posts having channeled portions, each presenting a wall facing the doorway and provided with a vertical row of perforations extending substantially the height of the doorway, each perforation opening into the channel and doorway space, and an adjustable supporting member bridging the space between said posts and having a pair of spaced projections at each of its ends adapted for engagement with selected perforations in the perforated walls of the channeled portions.

17. In a box car, a car body having supporting surfaces mounted in the car in opposed and spaced relation to each other, each surface having a vertical row of perforations therein, and an adjustable supporting member bridging the space between said surfaces and provided at its ends with projections to interchangeably engage the perforations therein, one of said projections comprising a tongue hinged at or near one end to the underside of the bar by a pivot extending transversely of the bar to swing toward and from the underside of the bar, said tongue being of a length between its pivoted end and its free end greater than the distance between its pivoted end and the end of the bar and having its free end forked to provide spaced engaging elements and having a stop shoulder to limit movement of said elements in the perforations of the supporting surface engaged thereby.

18. In supporting and partitioning means for use in box cars, a car having a doorway, posts at opposite sides of the doorway each having a channeled portion presenting a wall facing the doorway and a wall facing the interior of the car, the first-named walls of the posts having rows of perforations therein, and an adjustable supporting or partitioning member bridging the doorway and having projections at its ends adapted for engagement with the perforations in said perforated post walls.

19. In supporting and partitioning means for use in box cars, a car having a doorway, posts at opposite sides of the doorway each having a channeled portion presenting a wall facing the doorway and a wall facing the interior of the car, the first-named walls of the posts having rows of perforations therein, an adjustable supporting or partitioning member having projections at its ends adapted for engagement with the perforations in the perforated post walls, said member having keepers, and a support adapted to be disposed transversely of the car between the supporting or partitioning members and having projections at its ends to engage the keepers thereof.

20. In a box car, a car body having at each side end posts, posts defining a doorway, and intermediate posts, each doorway post having a channeled portion presenting a wall facing the doorway and a wall facing the interior of the car, the first-named wall being provided with a row of perforations extending from top to bottom thereof, an adjustable bar adapted to be disposed across the doorway and provided at its ends with projections adapted for engagement with the perforations in the perforated post walls, goods supporting members extending longitudinally of the car and bridging adjacent posts, said goods supporting members each having a row of perforations extending therealong, the members bridging the door posts and adjacent intermediate posts lapping over the second-named walls of the door posts, and a supporting member extending transversely of the car and having projections at its ends to engage the perforations in the goods supporting sheets.

21. In supporting and partitioning means for use in box cars, a car having doorways in its sides each provided with posts at opposite sides thereof, said posts having channels with walls facing the doorway and each having a vertical row of spaced perforations therein, an adjustable supporting or partitioning member adapted to be extended between said posts and having engaging members at its opposite ends adapted for engagement with the perforations in the posts, said member also having keeper elements, and cross supporting or partitioning members adapted to be engaged with said keeper elements of the supporting or partitioning members engaged with the doorway posts and extended across the car between the doorways.

22. In supporting and partitioning means for use in box cars, a car having doorways each provided with posts, each having a vertical row of perforations therein extending substantially from floor to roof of the car, adjustable supporting or partitioning members adapted to be disposed across the doorways and having projections adapted for engagement with the perforations in the posts and also having keepers therein, transverse supporting or partitioning members adapted to be extended across the interior of the car between the door ways and engaged with the keepers of the first-named supporting or partitioning members, said transverse supporting or partitioning members having engaging elements, and vertically disposed supporting sheets having openings therein for the reception of the engaging elements on said transverse supporting members and for the attachment of other supporting elements at different points thereon.

23. In supporting and partitioning means for use in box cars, a car having doorways in its opposite sides each provided with posts, each having a vertical row of keepers therein extending substantially between the floor and the roof of the car, adjustable supporting or partitioning members adapted to be extended across the doorways and having projections adapted for engagement with the keepers in the posts, a plurality of longitudinally spaced vertical transverse supporting or partitioning members adapted to be extended across the interior of the car between the door ways and provided with fastening means for engagement with the first-named supporting or partitioning members, said transverse supporting members having keepers, and horizontal members adapted to be extended between and engaged with the keepers of the transverse supporting members to form or support shelves or platforms at different elevations in the car.

24. In supporting and partitioning means for use in box cars, a car having doorways in its opposite sides each provided with posts, each having a vertical row of perforations therein extending substantially from floor to roof of the car, adjustable supporting or partitioning members adapted to be extended across the doorways and having projections adapted for engagement with the perforations therein, supporting or partitioning members adapted to be extended across the doorways and having projections to engage the perforations in the posts, transverse supporting or partitioning members adapted to be extended across the interior of the car between the doorways and provided with means for engagement with the first-named supporting or partitioning members, said transverse supporting elements having engaging elements thereon, vertically disposed partitioning sheets or plates adapted to be disposed transversely of the car and having rows of openings therein to receive the engaging elements on the transverse supporting members to partition the car into chambers or compartments, and horizontal supporting members having engaging elements adapted to be engaged with the openings in the sheets to form or support shelves or platforms at different elevations in the car.

25. In supporting and partitioning means for use in box cars, a car having a doorway, supporting posts at opposite sides of the doorway having channeled portions each having a wall interposed between the channel and doorway space, said walls each being provided with a vertical row of perforations, and a supporting or partitioning member adapted to be extended between said posts, said member being provided at one end with studs to engage the perforations in one of the posts and provided at its opposite end with sliding latch bolts to engage the perforations in the other post.

26. In supporting and partitioning means for use on box cars, a car having a doorway provided with channeled posts, each including a wall interposed between the post channel and the doorway space, said walls each having a vertical row of perforations therein for the adjustable engagement therewith of closure or supporting members, each perforation extending through the wall between the channel and doorway space.

27. In supporting and partitioning means for use in box cars, a car having side walls provided with transversely alined doorways, channeled stiles at the opposite sides of each doorway, each having a wall facing the doorway space and provided with a vertical row of openings extending substantially throughout its length, each opening extending through the wall between the channel and doorway space, supporting bars adapted to be extended across each doorway and provided with engaging elements adapted for detachable and adjustable engagement with the perforations in the said stiles, partition sheets carried by said bars and extending transversely of the car between the doorways, said partition sheets having openings therein, and article supporting members provided with fastening projections adapted to engage the openings in the sheets.

28. In supporting and partitioning means for use in box cars, a car having a side wall provided with a doorway, posts having channeled portions at the sides of the doorway, each channeled portion having a wall facing the doorway and a wall facing the interior of the car, the first-named wall of each channeled portion being provided with a vertical row of openings extending substantially throughout its length, and a supporting element adapted to be extended across the doorway between the walls and provided with engaging elements adapted for detachable and adjustable engagement with the perforations in said perforated wall.

29. In a box car, a car body having at each side end posts, door posts and intermediate posts, said door posts defining doorways and each post having a channeled portion including a wall facing the doorway and provided with a vertical row of perforations therein, horizontal supporting or partitioning members adapted to be disposed across the doorways and having projections adapted for engagement with the perforations in the door posts and also having keepers therein, goods supporting sheets bridging adjacent posts and having perforations therein, transverse supporting or partitioning members adapted to be extended across the interior of the car and engaged with the perforations of the first-named supporting or partitioning members and with said goods supporting sheets, said transverse supporting or partitioning members having engaging elements, and vertically disposed supporting sheets having openings therein for the reception of the engaging elements on said transverse supporting members and for the attachment of other supporting elements at different points thereon.

30. In a box car, a car having posts at its opposite sides defining a doorway and each provided with a channeled portion having a wall facing the doorway, said wall being formed with a vertical row of perforations extending substantially the height of the doorway, adjustable supporting or partitioning members adapted to be extended across the doorways at selected levels and having projections adapted for engagement with selected perforations in the perforated post walls, a plurality of longitudinally spaced vertical transverse supporting or partitioning members adapted to be extended across the interior of the car between the doorways and provided with fastening means for engagement with the first-named supporting or partitioning members, said transverse supporting members having keepers, and horizontal members adapted to be extended between and engaged with the keepers of the transverse supporting members to form or support shelves or platforms at different elevations in the car.

31. In supporting and partitioning means for use in box cars, a car having a side wall provided with a pair of outer posts and an intermediate post, the space between the intermediate post and one of the outer posts forming a doorway and the opposed faces of said posts being provided with vertical rows of perforations, a supporting member having projections at its opposite ends adapted for engagement with said posts, a wall sheathing closing the inner side of the space between the inner post and the other of said outer posts, a door for closing the outer side of the space between the intermediate post and the latter-named outer post, and a door for closing the doorway between the intermediate post and the first-named outer post.

32. In a box car, a car having a doorway including side posts having channeled portions, each presenting a wall facing the doorway and provided with a vertical row of perforations extending substantially the height of the doorway, each perforation opening into the channel and doorway space, and an adjustable supporting member bridging the space between said posts and having projections at each end thereof, said projections being adapted for engagement with selected perforations in the perforated walls of the channeled portions, the projections at at least one of the ends of the supporting member comprising a bolt slidable longitudinally of said member with means for locking said bolt in projected and retracted positions.

33. In a box car, a car body having supporting surfaces mounted vertically in opposed and spaced relation to each other and each having a vertical row of perforations therein, and an adjustable supporting member bridging the space between said surfaces and having end projections to engage selected perforations in said surfaces, at least one of the projections comprising a tongue hinged at or near one end to the underside of the bar by a pivot extending transversely of the bar to swing toward and from the underside of the bar, said tongue being of a length between its pivoted and free ends greater than the distance between its free end and the end of the bar and having its free end forked to provide spaced engaging elements to engage correspondingly spaced perforations of the supporting surface engaged thereby.

WILLIAM L. THOMAS.